United States Patent
Lee et al.

(10) Patent No.: US 8,701,188 B2
(45) Date of Patent: Apr. 15, 2014

(54) METHOD OF INTRUSION DETECTION IN TERMINAL DEVICE AND INTRUSION DETECTING APPARATUS

(75) Inventors: Sung-min Lee, Suwon-si (KR); Bok-deuk Jeong, Yongin-si (KR); Sang-bum Suh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1249 days.

(21) Appl. No.: 12/028,906

(22) Filed: Feb. 11, 2008

(65) Prior Publication Data

US 2009/0031421 A1    Jan. 29, 2009

(30) Foreign Application Priority Data

Jul. 26, 2007  (KR) .................. 10-2007-0075114

(51) Int. Cl.
*G06F 11/00* (2006.01)
(52) U.S. Cl.
USPC .................. 726/23; 726/17; 726/24; 726/26; 713/2; 713/168; 709/238
(58) Field of Classification Search
USPC ............... 726/2–5, 14–25; 713/151–152, 168
See application file for complete search history.

(56) References Cited

U.S. PATENT DOCUMENTS

| | | | |
|---|---|---|---|
| 6,519,698 B1 * | 2/2003 | Leyda et al. ............... 713/2 |
| 7,174,566 B2 * | 2/2007 | Yadav ............... 726/26 |
| 7,188,369 B2 * | 3/2007 | Ho et al. ............... 726/24 |
| 7,448,079 B2 * | 11/2008 | Tremain ............... 726/14 |
| 7,448,084 B1 * | 11/2008 | Apap et al. ............... 726/24 |
| 7,454,548 B2 * | 11/2008 | Belmar et al. ............... 710/260 |
| 7,739,532 B2 * | 6/2010 | Grobman ............... 713/322 |
| 7,788,699 B2 * | 8/2010 | Largman et al. ............... 726/1 |
| 7,797,748 B2 * | 9/2010 | Zheng et al. ............... 726/24 |
| 7,865,908 B2 * | 1/2011 | Garg et al. ............... 719/321 |
| 8,171,552 B1 * | 5/2012 | Chang ............... 726/24 |
| 8,239,942 B2 * | 8/2012 | Shanklin et al. ............... 726/23 |
| 2004/0101828 A1 * | 5/2004 | Clavel et al. ............... 435/5 |
| 2005/0050323 A1 * | 3/2005 | Mizrah ............... 713/168 |
| 2006/0092035 A1 * | 5/2006 | Abali et al. ............... 340/686.1 |
| 2006/0136720 A1 * | 6/2006 | Armstrong et al. ............... 713/164 |
| 2006/0206300 A1 | 9/2006 | Garg et al. |
| 2007/0150893 A1 | 6/2007 | Grobman |

(Continued)

FOREIGN PATENT DOCUMENTS

KR    10-2007-0108723 A    11/2007

OTHER PUBLICATIONS

Chen P, When Virtual is better than real, May 2001, IEEE, vol. 8, pp. 133-138.*

(Continued)

*Primary Examiner* — Cordelia Zecher
*Assistant Examiner* — Viral Lakhia
(74) *Attorney, Agent, or Firm* — Sughrue Mion, PLLC

(57) ABSTRACT

A method of intrusion detection in a terminal device that supports driving of a plurality of operating systems, is provided. The method includes collecting at a first operating system of the plurality of operating systems intrusion detection data for analyzing whether there is an intrusion in at least a second operating system of the plurality of operating systems; and performing at the first operating system an intrusion detection with respect to the at least a second operating system using the collected intrusion detection data.

16 Claims, 5 Drawing Sheets

(56) References Cited

U.S. PATENT DOCUMENTS

| | | | |
|---|---|---|---|
| 2008/0120720 A1* | 5/2008 | Guo et al. | 726/23 |
| 2010/0005531 A1* | 1/2010 | Largman et al. | 726/24 |
| 2010/0017879 A1* | 1/2010 | Kuegler et al. | 726/23 |
| 2010/0036889 A1* | 2/2010 | Joshi et al. | 707/200 |

OTHER PUBLICATIONS

Office Action issued Mar. 28, 2012 by the Korean Intellectual Property Office in counterpart Korean Patent Application No. 10-2007-0075114.

* cited by examiner

METHOD OF INTRUSION DETECTION IN TERMINAL DEVICE AND INTRUSION DETECTING APPARATUS

CROSS-REFERENCE TO RELATED PATENT APPLICATION

This application claims priority from Korean Patent Application No. 10-2007-0075114, filed on Jul. 26, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to a intrusion detection in a terminal device, and more particularly, to intrusion detection in a terminal device that supports a plurality of operating systems.

2. Description of the Related Art

As networking techniques are developed, attacks on terminal devices connected to networks continue to increase. Thus, a method of intrusion detection has been developed to protect terminal devices from attacks.

Related art systems for detecting intrusion include a network-based intrusion detection system (NIDS) that detects intrusion into a terminal device by analyzing network traffic in the network equipment, such as a router, and a host-based intrusion detection system (HIDS) that detects intrusion in a terminal device by analyzing traffic in the terminal device itself.

FIG. 1 is a block diagram for explaining a method of intrusion detection in a related art HIDS.

Referring to FIG. 1, an operating system 120 installed on a related art terminal device 110 includes an intrusion detecting apparatus 122. A terminal device can include devices that can be connected to a network such as personal computers (PCs), notebooks, personal digital assistants (PDAs), and mobile phones for example.

The intrusion detecting apparatus 122 includes a data collecting unit 122a, a data analyzing unit 122b, and a result notifying unit 122c. The intrusion detecting apparatus 122 may be implemented by a software-oriented module.

The data collecting unit 122a periodically collects intrusion detection data in order to analyze whether there is an intrusion in the operating system 120 or not.

The intrusion detection data includes access records for applications and data which can be used by the operating system 120. For example, if a third party approaches user data in the operating system 120 of a terminal device, records of when and how the data is used are created, and the intrusion detection data includes these records.

The data analyzing unit 122b determines whether there is an intrusion by analyzing the collected intrusion detection data.

If the data analyzing unit 122b determines that there is an intrusion, the result notifying unit 122c notifies the user that there is an intrusion.

In a the related art HIDS, the intrusion detecting apparatus 122 is driven together with another application in one operating system 120. Thus, if the operating system 120, on which the intrusion detecting apparatus 122 is installed, does not operate properly during an attack, the intrusion detecting apparatus 122 also will not operate properly. Additionally, the method of intrusion detection in a related art NIDS uses a method of analyzing network traffic, and thus, the intrusion on a terminal device cannot be analyzed in detail.

SUMMARY OF THE INVENTION

The present invention provides a method of intrusion detection in a terminal device for effectively detecting an intrusion on the terminal device, and an intrusion detecting apparatus that uses the method.

According to an aspect of the present invention, there is provided a method of intrusion detection with respect to each of a plurality of operating systems in a terminal device, which supports driving of the operating systems, the method comprising: one of the plurality of operating systems collecting intrusion detection data for analyzing whether there is an intrusion into at least one other of the plurality of operating systems; and the operating system using the collected intrusion detection data to perform an intrusion detection with respect to the at least one other of the plurality of operating systems using the collected intrusion detection data.

The performing of the intrusion detection may include: transmitting the intrusion detection data to a server for analyzing whether there is an intrusion; and receiving an analysis result from the server whether there is an intrusion on at least one other of the plurality of operating systems.

The transmitting of the intrusion detection data may be performed by encrypting the intrusion detection data using a predetermined encryption method.

The intrusion detection data may include access records for applications and data which can be used by the at least one other operating system.

The operating system, which performs the intrusion detection may be an operating system that is protected from an external intrusion.

The plurality of operating systems may be separated from each other so as to not mutually approach, and the operating system, which performs the intrusion detection may collect intrusion detection data from at least one other of the plurality of operating systems using a virtual machine monitor (VMM) technique.

The method may further include performing a selective approach control with respect to at least one other operating system based on the performance result of the intrusion detection.

The performing of a selective approach control may be the control of the ratio of using a computer central processing unit (CPU) or memory of the terminal device by the operating system, which is determined as intruded into among plurality of operating systems.

The method may further include selectively restoring damaged data in the at least one other of the plurality of operating systems based on the performance result of the intrusion detection.

The selectively restoring may include receiving a data back-up for restoring the damaged data in the operating system, which is determined as intruded into, from a server and performing the restoration with the data back-up, wherein the data back-up from the terminal device is received by the server at a predetermined interval, and further wherein the data is important data used in the at least one other of the plurality of operating systems or is image data generated with respect to the at least one other of the plurality of operating systems.

According to an aspect of the present invention, there is provided an intrusion detecting apparatus, which performs intrusion detection with respect to each of a plurality of operating systems in a terminal device that supports driving of the operating systems, the intrusion detecting apparatus including: a data collecting unit, which is installed on one of the operating systems and which collects intrusion detection data for analyzing whether there is an intrusion into any of the operating systems from at least one other of the plurality of operating systems; and an intrusion detecting unit, which is installed on the operating system on which the data collecting unit is installed, and which performs intrusion detection with respect to the at least one other of the plurality of operating systems using the intrusion detection data collected by the data collecting unit.

The intrusion detecting unit may include: a data transmitting unit, which transmits collected intrusion detection data to a server for analyzing whether there is an intrusion; and an analysis result receiving unit that receives an analysis result from the server whether there is an intrusion into the at least one other of the plurality of operating systems.

The intrusion detecting apparatus may further include an encryption unit, which encrypts the intrusion detection data, wherein the data transmitting unit transmits the intrusion detection data encrypted with a predetermined encryption method.

The intrusion detecting apparatus may further include a virtualization unit, which collects the intrusion detection data from at least one other operating system and which transmits the intrusion detection data to the data collecting unit, if the operating systems are separated so as to not mutually approach.

According to an aspect of the present invention, there is provided a computer readable recording medium for executing the method of performing intrusion detection with respect to a plurality of operating systems in a terminal device, which supports the operating systems, wherein the method includes: one of the plurality of operating systems collecting intrusion detection data for analyzing whether there is an intrusion into at least one other of the plurality of operating systems; and the one of the plurality of operating systems using the collected intrusion detection data to perform an intrusion detection into the at least one other operating system using the collected intrusion detection data.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS THE INVENTION

The present invention will now be described more fully with reference to the accompanying drawings in which exemplary embodiments of the invention are shown.

Figure 1:
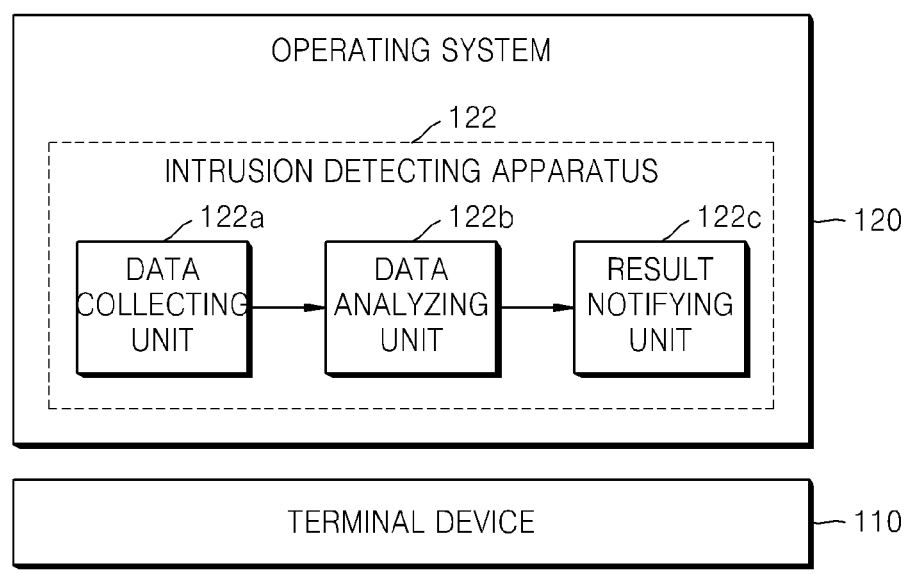
FIG. 1 is a block diagram for explaining a method of intrusion detection in a related art HIDS.
Figure 2:
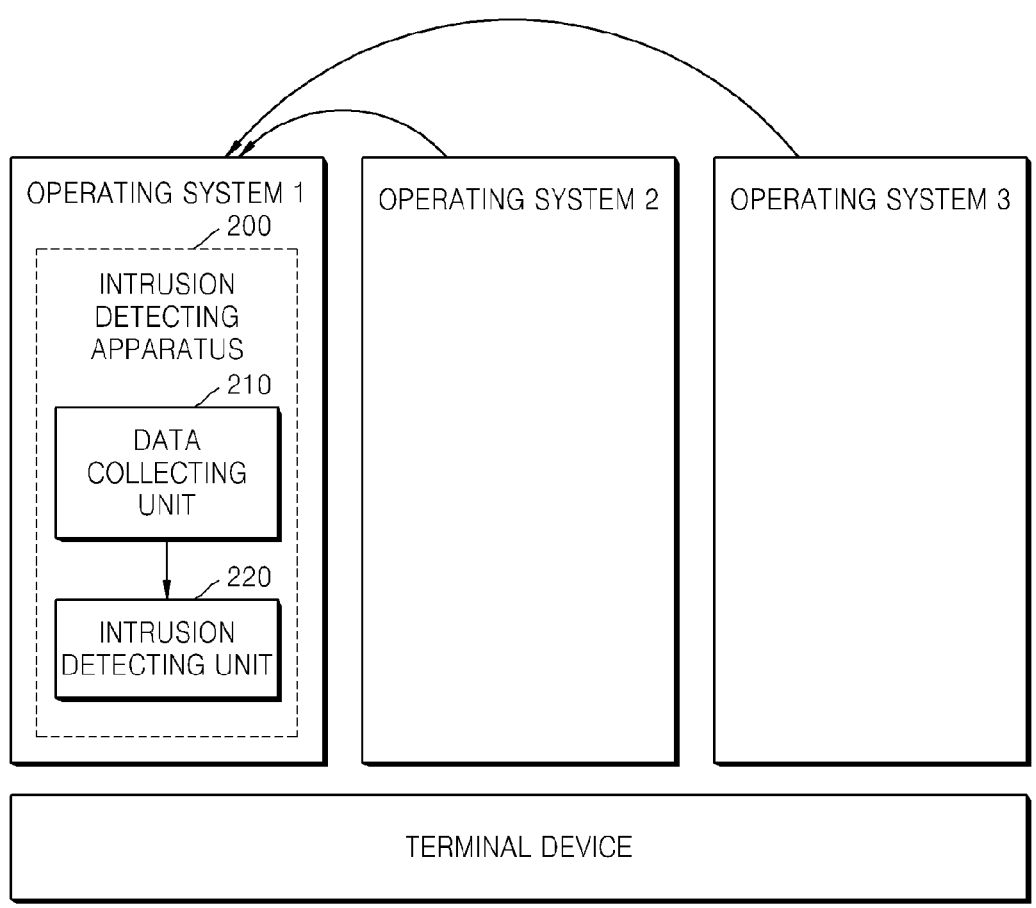
FIG. 2 is a block diagram for explaining an intrusion detecting apparatus according to an exemplary embodiment of the present invention.

FIG. 2 is a block diagram for explaining an intrusion detecting apparatus 200 according to an exemplary embodiment of the present invention.

Referring to FIG. 2, the intrusion detecting apparatus 200 according to the present embodiment includes a data collecting unit 210 and an intrusion detecting unit 220. The intrusion detecting unit 220 is run on an operating system 1.

FIG. 2 shows a system in which operating systems 1 through 3 are run at the same time in a terminal device that supports driving a plurality of operating systems.

The operating systems can be operating systems of various types such Windows, Linux, and Unix.

The data collecting unit 210 is installed on one of the operating systems and collects intrusion detecting data for analyzing whether there is an intrusion into any of the operating systems from at least one other operating system.

In FIG. 2, the data collecting unit 210 is installed on the operating system 1 and collects intrusion detection data from operating systems 2 and 3.

The intrusion detecting unit 220 is installed on operating system 1, where the data collecting unit 210 is installed, and performs intrusion detection with respect to at least one of the other operating systems 2 and 3 using intrusion detection data collected by the data collecting unit 210.

In FIG. 2, the intrusion detecting unit 220 installed on the operating system 1 analyzes intrusion detection data collected from operating systems 2 and 3, and determines whether there is an intrusion in operating systems 2 and 3 from the outside.

In the present exemplary embodiment, the intrusion detecting apparatus 200 is not installed in all of the operating systems 1 through 3. As depicted in FIG. 2, if the intrusion detecting apparatus 200 is installed on the operating system 1, the intrusion detecting apparatus 200 detects the intrusion on the operating systems 2 and 3. Therefore, when there is an intrusion in the operating systems 2 and 3, the intrusion with respect to the operating systems 2 and 3 can be determined, so long as there is no intrusion in the operating system 1.

Preferably, but not necessarily, the intrusion detecting apparatus 200 can be installed on a kernel of the operating system 1, and the operating system on which the intrusion detecting apparatus 200 is installed can be protected from external intrusion and/or from being approached by a user. For example, a user can be prevented from approaching the operating system 1 shown in FIG. 2. Also, the operating system 1 may be configured not to be connected to a network in order to protect the operating system 1 from an external intrusion.

In FIG. 2, three operating systems 1 through 3 are depicted. However, the operating system according to the present invention is not limited thereto, and more than two operating systems can be simultaneously driven.

According to how it is configured, the intrusion detection data may not be analyzed in the intrusion detecting unit 220.

Figure 3:
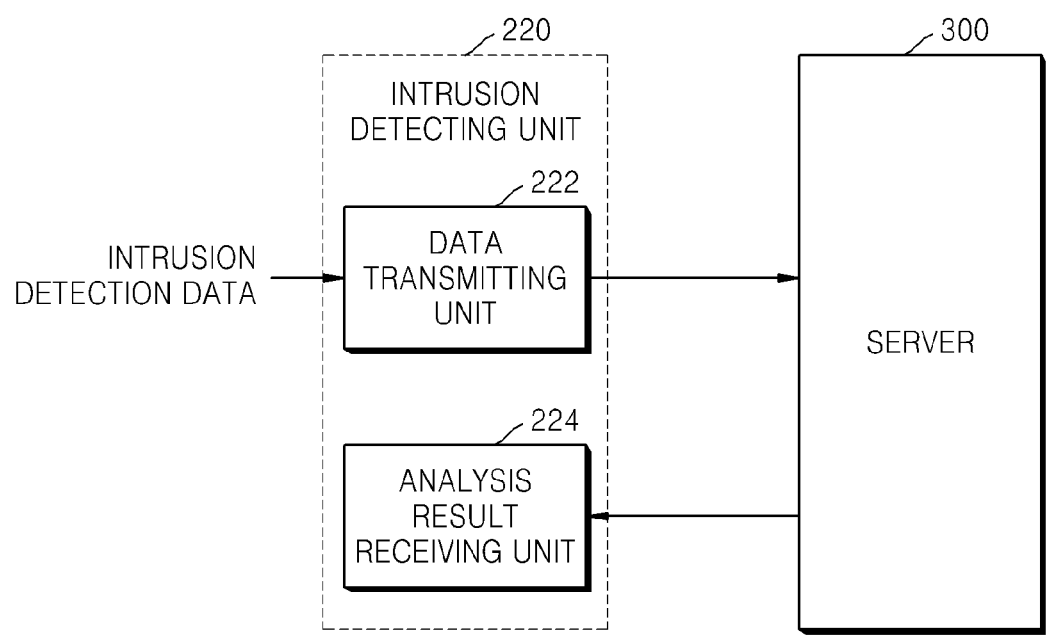
FIG. 3 is a block diagram for explaining an intrusion detecting unit according to an exemplary embodiment of the present invention.

FIG. 3 is a block diagram for explaining the intrusion detecting unit 220 according to an exemplary embodiment of the present invention.

Referring to FIG. 3, the intrusion detecting unit 220 includes a data transmitting unit 222 and an analysis result receiving unit 224. The data transmitting unit 222 transmits the intrusion detection data collected by the data collecting unit 210 to a server 300 which analyzes whether there is an intrusion.

At this point, the intrusion detection data can be transmitted by encrypting using a predetermined encryption method.

Preferably, but not necessarily the intrusion detecting apparatus 200 can further include an encrypting unit (not shown) for encrypting the intrusion detection data.

The analysis result receiving unit 224 receives an analysis result from the server 300 indicating whether there is an intrusion on at least one other operating system.

In the exemplary embodiment shown in FIG. 3, the intrusion detection data is not analyzed in the intrusion detecting unit 220. Instead, after analyzing the intrusion detection data in the server 300, the analysis result is transmitted to the analysis result receiving unit 224 from the server 300.

In the present exemplary embodiment, since the intrusion detecting unit 220 does not analyze the intrusion detection data, it is unnecessary to store detection data in the intrusion detecting unit 220. Thus, storage space is saved in the terminal device onto which the intrusion detection device is installed, as well as reducing the use of the CPU and battery consumption in the terminal device.

In FIG. 2, the intrusion detecting apparatus 200 according to an exemplary embodiment of the present invention directly collects intrusion detection data from the operating systems 2 and 3. However, the operating systems 1 through 3 driven in the terminal device can be separated from each other so that the operating systems 1 through 3 cannot be mutually approached.

In this arrangement, the intrusion detecting apparatus 200 installed in the operating system 1 cannot directly collect intrusion detection data from the operating systems 2 and 3, but instead must collect intrusion detection data from the operating systems 2 and 3 using a virtual machine monitor (VMM) technique.

Figure 4:
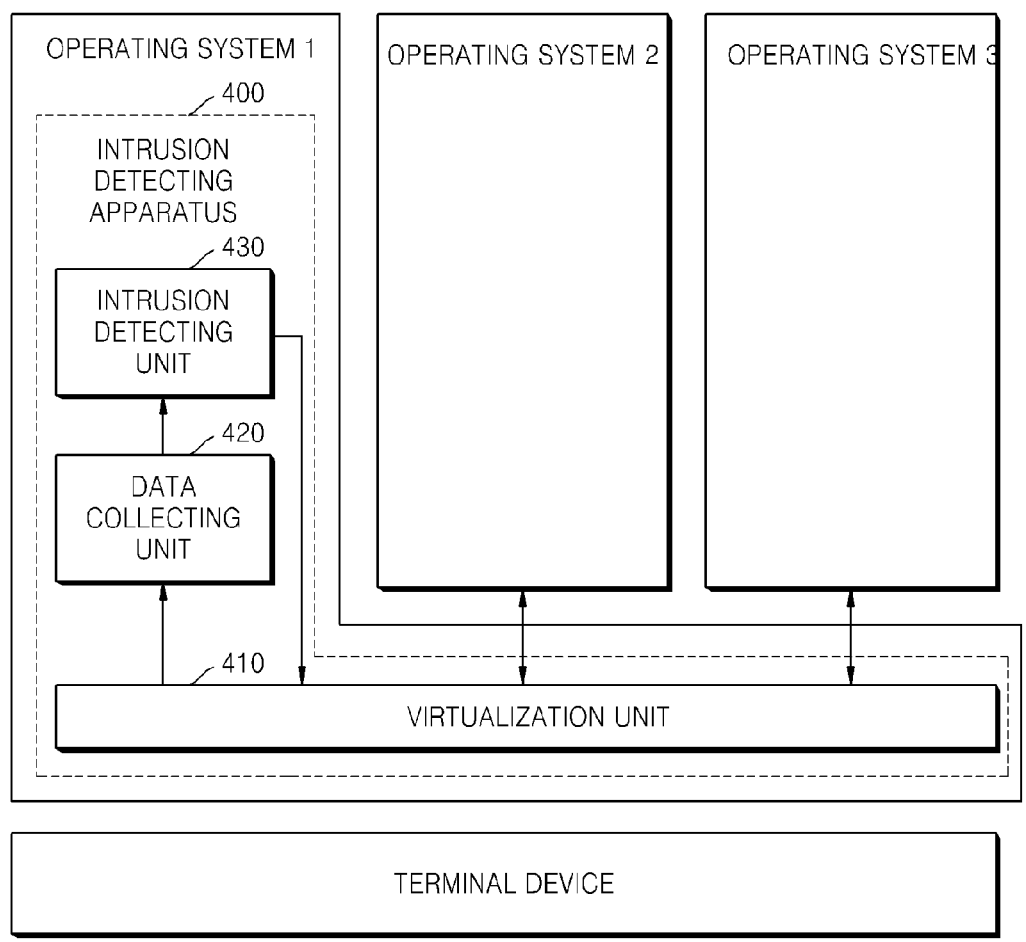
FIG. 4 is a block diagram for explaining an intrusion detecting apparatus according to another exemplary embodiment of the present invention.

FIG. 4 is a block diagram for explaining an intrusion detecting apparatus 400 according to another exemplary embodiment of the present invention.

Referring to FIG. 4, the intrusion detecting apparatus 400 includes a virtualization unit 410, a data collecting unit 420, and an intrusion detecting unit 430.

The virtualization unit 410 collects intrusion detection data from at least one other operating system and transmits it to the data collecting unit 420.

The virtualization unit 410 may be implemented in a software-oriented module, and is operated as a virtual hardware to control the operating systems.

When a VMM technique is used, a plurality of operating systems can be simultaneously driven in a terminal device. In the present embodiment, as depicted in FIG. 4, the virtualization unit 410 is installed on the operating system 1, and thus, intrusion detection data can be collected from the operating system 2 and 3.

Also, the virtualization unit 410 can transmit intrusion detection data to the operating system 1 by collecting the intrusion detection data from the operating systems 2 and 3 while the virtualization unit 410 is separately driven without being installed on the operating systems 1 through 3.

The virtualization unit 410 can selectively perform an approach control with respect to at least one other operating system based on an intrusion detection performance result of the intrusion detecting unit 430.

For example, if it is determined from the intrusion detection performance result of the intrusion detecting unit 430 that there is an intrusion in the operating system 2, the virtualization unit 410 in FIG. 4 can reduce a ratio of CPU or memory usage of the terminal device by the operating system 2. That is, even in the case that there is no limit in using the CPU or memory of the terminal device before the operating system 2 is intruded, the virtualization unit 410 can control the operating system 2 to use less than 10% of the total CPU and memory of the terminal device, when the operating system 2 is determined as being intruded.

Also, the virtualization unit 410 can selectively restore damaged data in at least one other operating system based on an intrusion detection performance result of the intrusion detecting unit 430.

For example, if there is an operating system that is determined as being intruded based on the intrusion detection performance result of the intrusion detecting unit 430, a restoration with respect to the operating system that is determined as being intruded can be performed using image data of the operating system.

The virtualization unit 410 can restore the damaged data using back-up data stored in the terminal device or can restore the damaged data by receiving back-up data from the server.

The intrusion detecting unit 220 of FIG. 3, according to an exemplary embodiment of the present invention, transmits the intrusion detection data to a server in a predetermined interval. In the same manner, the back-up data stored in the server is transmitted from the intrusion detecting unit 220 in a predetermined interval, wherein the data is important data used in at least one of the plurality of operating systems or is image data generated with respect to at least one of the plurality of operating systems.

The interval of transmitting the intrusion detection data can be short, 10 minutes or 30 minutes, for example. However, the interval of transmitting the back-up data can be long, one hour or one day, for example.

The operations of the data collecting unit 420 and the intrusion detecting unit 430 are identical to the operations of the data collecting unit 210 and the intrusion detecting unit 220 of FIG. 2, and thus, the detailed descriptions thereof will not be repeated.

Figure 5:
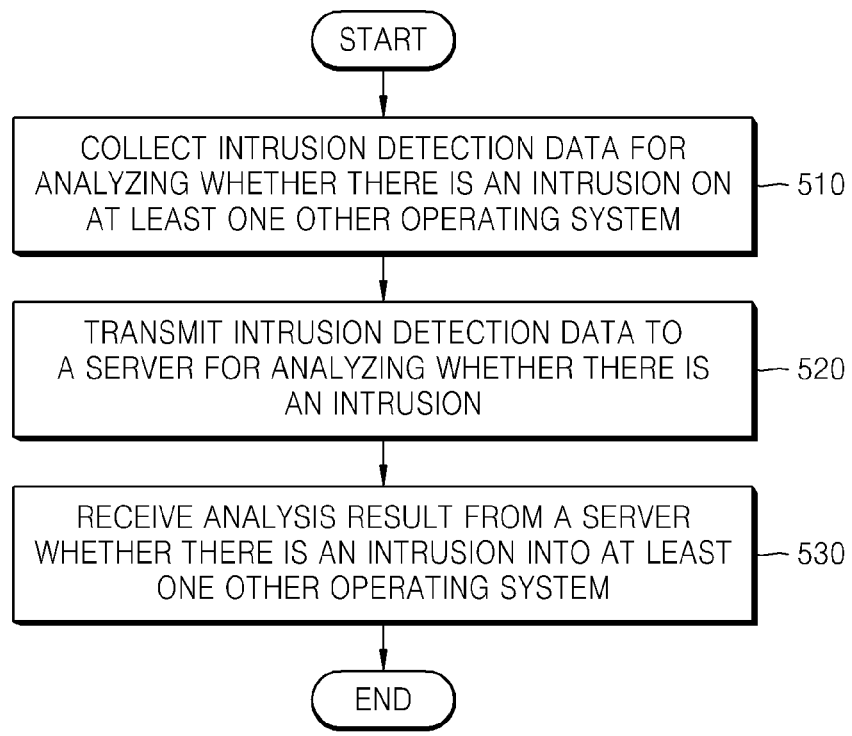
FIG. 5 is a flow chart showing a method of intrusion detection according to an exemplary embodiment of the present invention.

FIG. 5 is a flow chart for explaining a method of intrusion detection according to an exemplary embodiment of the present invention.

In an operation 510, at least one of a plurality of operating systems collects intrusion detection data for analyzing whether there is an intrusion on at least one other operating system.

More specifically, an intrusion detecting apparatus installed on one of the plurality of operating systems collects intrusion detection data for analyzing whether there is an intrusion on at least one other operating system.

However, in the case that the operating systems are separated so that they cannot approach each other, as described above, the intrusion detecting apparatus collects intrusion detection data using the VMM technique. That is, a virtualization unit collects intrusion detection data from other operating systems, and transmits the collected intrusion detection data to the intrusion detecting apparatus.

In this way, the intrusion detecting apparatus for determining which operating system is intruded is installed on one of the other operating systems, not on the operating system that is intruded. Thus, whether there is an intrusion on the operating system or not can be effectively determined.

In an operation 520, the intrusion detection data is transmitted to a server for analyzing whether there is an intrusion.

In an operation 530, the intrusion detecting apparatus receives an analysis result with respect to whether there is an intrusion on at least one other operating system from the server.

Since the intrusion detection data is analyzed by a server rather than an intrusion detecting unit, it is unnecessary to save the intrusion detection data. Thus, there is more storage space on the terminal device on which the intrusion detecting device is installed, and the CPU usage and battery consumption of the terminal device can be reduced.

According to how it is configured, the intrusion analysis can be performed in the server like in the operations 520 and 530, but the analysis can be performed in an intrusion detecting apparatus.

The exemplary embodiments of the present invention can be realized as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention. The exemplary embodiments should be considered in descriptive sense only and not for purpose of limitation. Therefore, the scope of the invention is defined not by the detailed description of the invention but by the appended claims, and all differences within the scope will be construed as being included in the present invention.

What is claimed is:

1. A method of intrusion detection with respect to each of a plurality of operating systems in a terminal device that supports driving of the plurality of operating systems, the method comprising:
    collecting, at a first operating system of the plurality of operating systems in the terminal device, intrusion detection data from at least a second operating system of the plurality of operating systems in the terminal device;
    performing, at the first operating system in the terminal device, an intrusion detection with respect to the at least a second operating system in the terminal device using the collected intrusion detection data; and
    performing a selective approach control with respect to the at least a second operating system of the plurality of operating systems based on a result of the performing the intrusion detection,
    wherein the performing the intrusion detection comprises analyzing the collected intrusion data and determining whether there is an intrusion in the at least a second operating system,
    wherein the first operating system is configured not to be connected to a network of an external device,
    wherein the performing the selective approach control comprises controlling of a ratio of using a central processing unit or memory of the terminal device, by the at least a second operating system into which intrusion is determined to have occurred among the plurality of operating systems.

2. The method of claim 1, wherein the performing the intrusion detection comprises:
    transmitting the intrusion detection data to a server for analyzing whether there is an intrusion; and
    receiving an analysis result from the server indicating whether there is an intrusion into at the at least a second operating system.

3. The method of claim 2, wherein the transmitting the intrusion detection data is performed by encrypting the intrusion detection data using a predetermined encryption method and transmitting the encrypted intrusion detection data to the server.

4. The method of claim 2, wherein the intrusion detection data comprises access records for applications and data which is used by the at least a second operating system.

5. The method of claim 1, wherein the first operating system is an operating system that is protected from an external intrusion.

6. The method of claim 1, wherein the plurality of operating systems are separated so as to not mutually approach each other, and the first operating system collects intrusion detection data from the at least a second operating system using a virtual machine monitor technique.

7. The method of claim 1, further comprising selectively restoring damaged data in the at least a second operating system based on a result of the performing the intrusion detection.

8. The method of claim 7, wherein the selectively restoring comprises receiving back-up data for restoring damaged data in the at least a second operating system from a server and restoring the damaged data with the back-up data, wherein the back-up data is received by the server at a predetermined interval from the terminal device and the data is important data used in the at least a second operating system or image data generated with respect to the at least a second operating system.

9. An intrusion detecting apparatus that is installed in a first operating system of a plurality of operating systems and performs intrusion detection with respect to each of the plurality of operating systems in a terminal device comprising a memory that stores the plurality of operating systems and a central processing unit that supports driving of the plurality of operating systems, the intrusion detecting apparatus comprising:
    a data collecting unit that collects intrusion detection data from at least a second operating system of a plurality of operating systems in the terminal device; and
    an intrusion detecting unit performs intrusion detection with respect to the at least a second operating system in the terminal device using the intrusion detection data collected by the data collecting unit; and
    a virtualization unit that collects the intrusion detection data from the at least a second operating system of the plurality of operating systems, and transmits the intrusion detection data to the data collecting unit if the operating systems are separated so as to not mutually approach each other,
    wherein the intrusion detection performed by the intrusion detecting unit comprises analyzing the collected intrusion data and determining whether there is an intrusion in the at least a second operating system,
    wherein the first operating system is configured not to be connected to a network of an external device,
    wherein the virtualization unit performs selective approach control with respect to the at least a second operating system based on the intrusion detection performance result of the intrusion detecting unit, and controls a ratio of using a central processing unit or memory of the terminal device by the at least a second operating system, which is determined as intruded into, among the plurality of operating systems.

10. The intrusion detecting apparatus of claim 9, wherein the intrusion detecting unit comprises:
    a data transmitting unit that transmits collected intrusion detection data to a server for analyzing whether there is an intrusion; and
    an analysis result receiving unit that receives an analysis result from the server with respect to the at least a second operating system whether there is an intrusion.

11. The intrusion detecting apparatus of claim 10, further comprising an encryption unit that encrypts the intrusion detection data, wherein the data transmitting unit transmits the intrusion detection data encrypted using a predetermined encryption method by the encryption unit.

12. The intrusion detecting apparatus of claim 10, wherein the intrusion detection data comprises access records for applications and data which is used by the at least a second operating system.

13. The intrusion detecting apparatus of claim 9, wherein the first operating system is protected from an external intrusion.

14. The intrusion detecting apparatus of claim 9, wherein the virtualization unit restores damaged data in the at least a second operating system based on the intrusion detection performance result of the intrusion detecting unit.

15. The intrusion detecting apparatus of claim 14, wherein the virtualization unit receives a back-up data from a server to restore damaged data in the at least a second operating system that is determined as intruded, wherein the back-up data is received from the terminal device by the server at a predetermined interval and the data is important data used in the at least a second operating system or image data generated with respect to the at least a second operating system.

16. A non-transitory computer readable recording medium having recorded thereon a program executable by a computer for performing the method of claim 1.

* * * * *